United States Patent
Schnupper et al.

(10) Patent No.: US 9,642,342 B2
(45) Date of Patent: May 9, 2017

(54) PERISTALTIC PUMP ASSEMBLY FOR SELECTIVE IN OVO INJECTION, AND ASSOCIATED SYSTEM AND METHOD

(71) Applicant: Zoetis Services LLC, Florham Park, NJ (US)

(72) Inventors: Michael Glenn Schnupper, Raleigh, NC (US); Daniel Scott Rees, Zebulon, NC (US); Yale Sebastian Giffin, Cary, NC (US); Thomas Matthew Hessler, Raleigh, NC (US)

(73) Assignee: Zoetis Services LLC, Parsippany, NJ (US)

( * ) Notice: Subject to any disclaimer, the term of this patent is extended or adjusted under 35 U.S.C. 154(b) by 64 days.

(21) Appl. No.: 14/507,901

(22) Filed: Oct. 7, 2014

(65) Prior Publication Data
US 2015/0096497 A1    Apr. 9, 2015

Related U.S. Application Data

(60) Provisional application No. 62/032,831, filed on Aug. 4, 2014, provisional application No. 61/888,251, filed on Oct. 8, 2013.

(51) Int. Cl.
*A01K 45/00* (2006.01)
*F04B 13/00* (2006.01)
*F04B 43/12* (2006.01)

(52) U.S. Cl.
CPC ........... *A01K 45/007* (2013.01); *F04B 13/00* (2013.01); *F04B 43/1284* (2013.01); *F04B 43/1292* (2013.01)

(58) Field of Classification Search
CPC ........ A47J 47/01; A01K 45/007; F04B 13/00; F04B 43/1284; F04B 43/1292
(Continued)

(56) References Cited

U.S. PATENT DOCUMENTS

| 3,723,030 A | | 3/1973 | Gelfand |
| 4,040,388 A | * | 8/1977 | Miller .................. A01K 45/007 119/6.8 |

(Continued)

FOREIGN PATENT DOCUMENTS

| EP | 1304030 A3 | 5/2003 |
| EP | 2017477 A1 | 1/2009 |
| WO | WO 99/11933 A1 | 3/1999 |

OTHER PUBLICATIONS

PCT International Search Report and Written Opinion, date of mailing Feb. 18, 2015; International Application No. PCT/US2014/059327.

*Primary Examiner* — Leslie A Nicholson, III
*Assistant Examiner* — Kimberley S Wright
(74) *Attorney, Agent, or Firm* — Scott C. Mayhew

(57) ABSTRACT

An in ovo injection apparatus is provided. Such an in ovo injection apparatus includes an injection assembly having a plurality of injection devices, each injection device being configured to pierce a respective avian egg. A selectable peristaltic pump assembly is in fluid communication with the injection assembly. The selectable peristaltic pump assembly is configured to selectively supply a treatment substance from a fluid reservoir to the injection devices such that the injection devices are capable of selectively dispensing the treatment substance. An associated method is also provided.

9 Claims, 17 Drawing Sheets

(58) Field of Classification Search
USPC .............................. 119/6.8; 417/475, 477.1
See application file for complete search history.

(56) References Cited

U.S. PATENT DOCUMENTS

| | | | | |
|---|---|---|---|---|
| 4,593,646 | A * | 6/1986 | Miller | A01K 45/007 |
| | | | | 119/6.8 |
| 4,903,635 | A * | 2/1990 | Hebrank | A01K 43/10 |
| | | | | 119/6.8 |
| 5,158,038 | A * | 10/1992 | Sheeks | A01K 45/007 |
| | | | | 119/6.8 |
| 5,941,696 | A | 8/1999 | Fenstermacher et al. | |
| 6,032,612 | A * | 3/2000 | Williams | A01K 45/007 |
| | | | | 119/6.8 |
| 6,427,844 | B2 * | 8/2002 | Hebrank | A01K 43/00 |
| | | | | 209/510 |
| 9,241,477 | B2 * | 1/2016 | Mukaddam | A01K 45/007 |
| 2005/0263079 | A1 * | 12/2005 | Karaca | A01K 45/007 |
| | | | | 119/6.8 |
| 2006/0156989 | A1 * | 7/2006 | Hebrank | A01K 45/007 |
| | | | | 119/6.8 |
| 2009/0000554 | A1 | 1/2009 | Hebrank et al. | |
| 2014/0014040 | A1 * | 1/2014 | Mukaddam | A01K 45/007 |
| | | | | 119/6.8 |
| 2016/0007575 | A1 * | 1/2016 | Hessler | A01K 45/007 |
| | | | | 119/6.8 |

* cited by examiner

FIG. 14
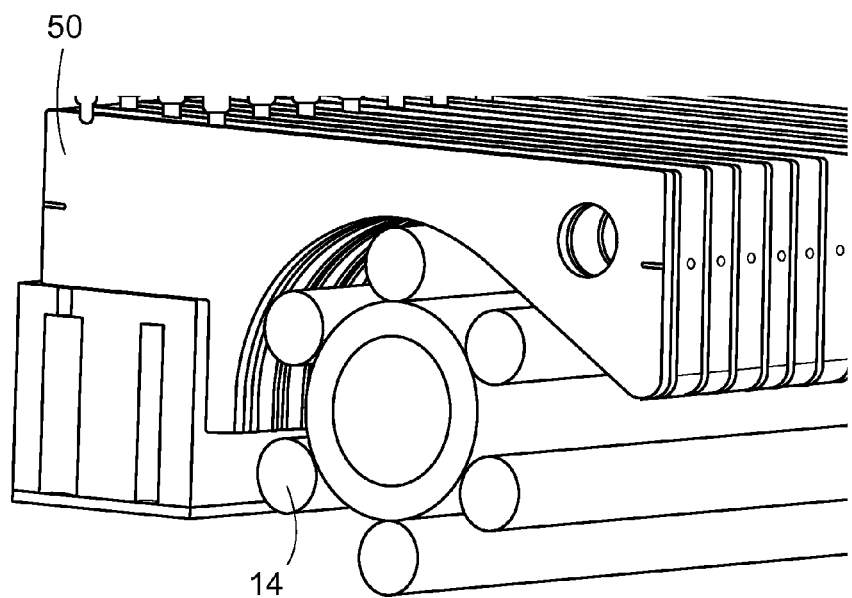
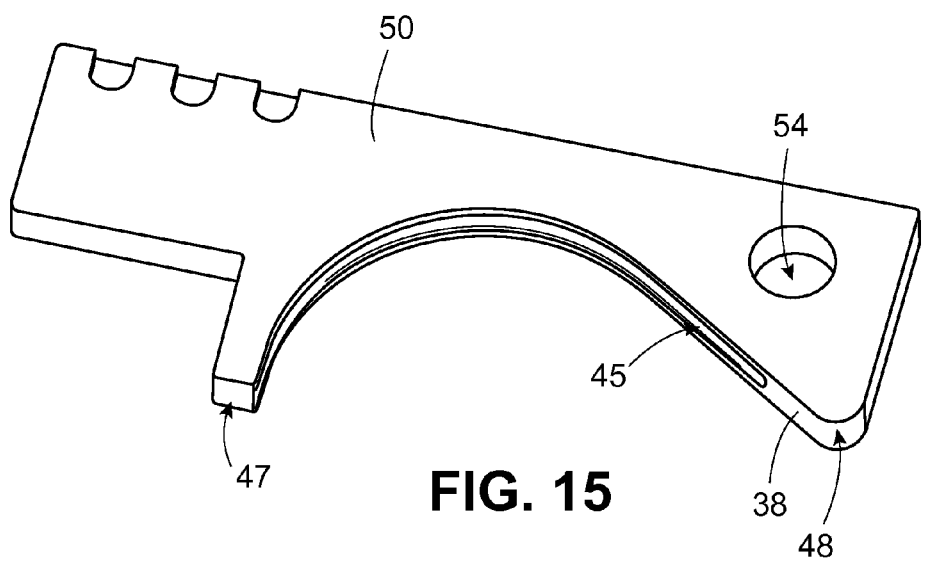
FIG. 15

PERISTALTIC PUMP ASSEMBLY FOR SELECTIVE IN OVO INJECTION, AND ASSOCIATED SYSTEM AND METHOD

CROSS REFERENCE TO RELATED APPLICATIONS

This application claims the benefit of U.S. Provisional Patent Application Nos. 61/888,251, filed Oct. 8, 2013, and 62/032,831, filed Aug. 4, 2014, both of which are expressly incorporated herein by reference in their entirety.

TECHNICAL FIELD

The present disclosure generally relates to fluid pump systems. More particularly, the present disclosure relates to a peristaltic pump assembly for metering small quantities of fluid through a plurality of tubes in a selective manner over extended periods of operation, and an associated system and method.

BACKGROUND

In many instances, it is desirable to introduce a substance into a live avian egg prior to hatch. Injection of various substances into avian eggs is commonly referred to as in ovo injection. Such injections have been employed to decrease post-hatch mortality rates, increase the potential growth rates or eventual size of the resulting bird, and even to influence the gender determination of the embryo. Similarly, injections of antigens into live eggs have been employed to incubate various substances used in vaccines which have human or animal medicinal or diagnostic applications. Examples of substances that have been used for, or proposed for, in ovo injection include vaccines, antibiotics and vitamins.

An egg injection apparatus (i.e., in ovo injection apparatus) may comprise a plurality of injection devices which operate simultaneously to inject a plurality of eggs. The injection apparatus may comprise an injection head which comprises the injection devices, and wherein each injection device is in fluid communication with a source containing a treatment substance to be injected. The in ovo injection apparatus conventionally is designed to operate in conjunction with commercial egg carriers or flats. Egg flats utilized in conjunction with an in ovo injection apparatus typically contain an array of pockets that are configured to support a respective plurality of avian eggs in a generally upright orientation. The egg flats may be typically transported through the in ovo injection apparatus via an automated conveyor system for registering the egg flat beneath the injection head for injection of the eggs carried by the egg flat. In ovo injection of substances (as well as in ovo extraction of materials) typically occurs by piercing an egg shell to form an opening (e.g., via a punch), extending an injection needle through the hole and into the interior of the egg (and in some cases into the avian embryo contained therein), and injecting treatment substance(s) through the needle and/or removing material therefrom.

Previous in ovo fluid delivery systems have employed peristaltic pumps for delivering the treatment substance out of all the injection devices simultaneously during an injection sequence. However, in some instances, it is desirable to implement in ovo injection selectively such that the treatment substance is not dispensed into dead, infertile, or missing eggs, for example, so as not to waste vaccine. Previous peristaltic pump systems implemented on in ovo vaccination systems did not provide such flexibility to allow for selective injection of viable eggs.

Accordingly, it would be desirable to provide a fluid pump assembly for implementation on an in ovo injection apparatus capable of providing selective delivery of treatment substances to selected target eggs identified as viable. Furthermore, it would be desirable to provide an associated method and system that would facilitate selective injection of a treatment substance into selected target eggs in a flat.

BRIEF SUMMARY

The above and other needs are met by aspects of the present disclosure which, according to one aspect, provides a peristaltic pump assembly comprising a housing. A rotatable assembly is disposed within the housing and includes a plurality of roller tubes adapted to interact with a plurality of compressible fluid delivery tubes. A plurality of engagement members are individually actuatable and cooperate to form a backing plate arrangement spaced from the rotatable assembly a predetermined distance in order to facilitate closure of a respective compressible fluid delivery tube disposed between the rotatable assembly and the respective engagement member. Each engagement member cooperates with the tube rollers to maintain a respective compressible fluid delivery tube in alignment therewith.

Another aspect provides a method of selectively pumping fluids through a plurality of compressible fluid delivery tubes. The method comprises mounting a plurality of compressible fluid delivery tubes between a plurality of engagement members, cooperating to form a backing plate arrangement, and a rotatable assembly spaced from the backing plate arrangement a predetermined distance in order to facilitate closure of a lumen of a respective compressible fluid delivery tube in an area of contact. The method further comprises positioning each compressible fluid delivery tube between a plurality of roller tubes and a respective engagement member. The roller tubes and engagement members cooperate to maintain the compressible fluid delivery tubes in alignment. The method further comprises selectively actuating the engagement members to interact with respective compressible fluid delivery tubes. The method further comprises rotating the rotatable assembly in a direction about a central axis thereof and along a length of the compressible fluid delivery tubes so as to supply a fluid substance through the compressible fluid delivery tubes associated with the engagement members being selectively actuated.

Yet another aspect provides an in ovo injection apparatus adapted to inject a plurality of avian eggs with a treatment substance. The apparatus comprises an injection assembly having a plurality of injection devices, each injection device being configured to pierce a respective avian egg. A selectable peristaltic pump assembly is in fluid communication with the injection assembly. The selectable peristaltic pump assembly is configured to selectively supply a treatment substance from a fluid reservoir to the injection devices such that the injection devices are capable of selectively dispensing the treatment substance. The selectable peristaltic pump assembly includes a housing, a rotatable assembly disposed within the housing and having a plurality of roller tubes configured to interact with the compressible fluid delivery tubes, and a plurality of engagement members individually actuatable and cooperating to form a backing plate arrangement spaced from the rotatable assembly a predetermined distance in order to facilitate closure of a respective compressible fluid delivery tube disposed between the rotatable assembly and the respective engagement member. Each engagement member cooperates with the tube rollers to maintain a respective compressible fluid delivery tube in alignment therewith.

Thus, various aspects of the present disclosure provide advantages, as otherwise detailed herein.

BRIEF DESCRIPTION OF THE DRAWINGS

Figure 1:
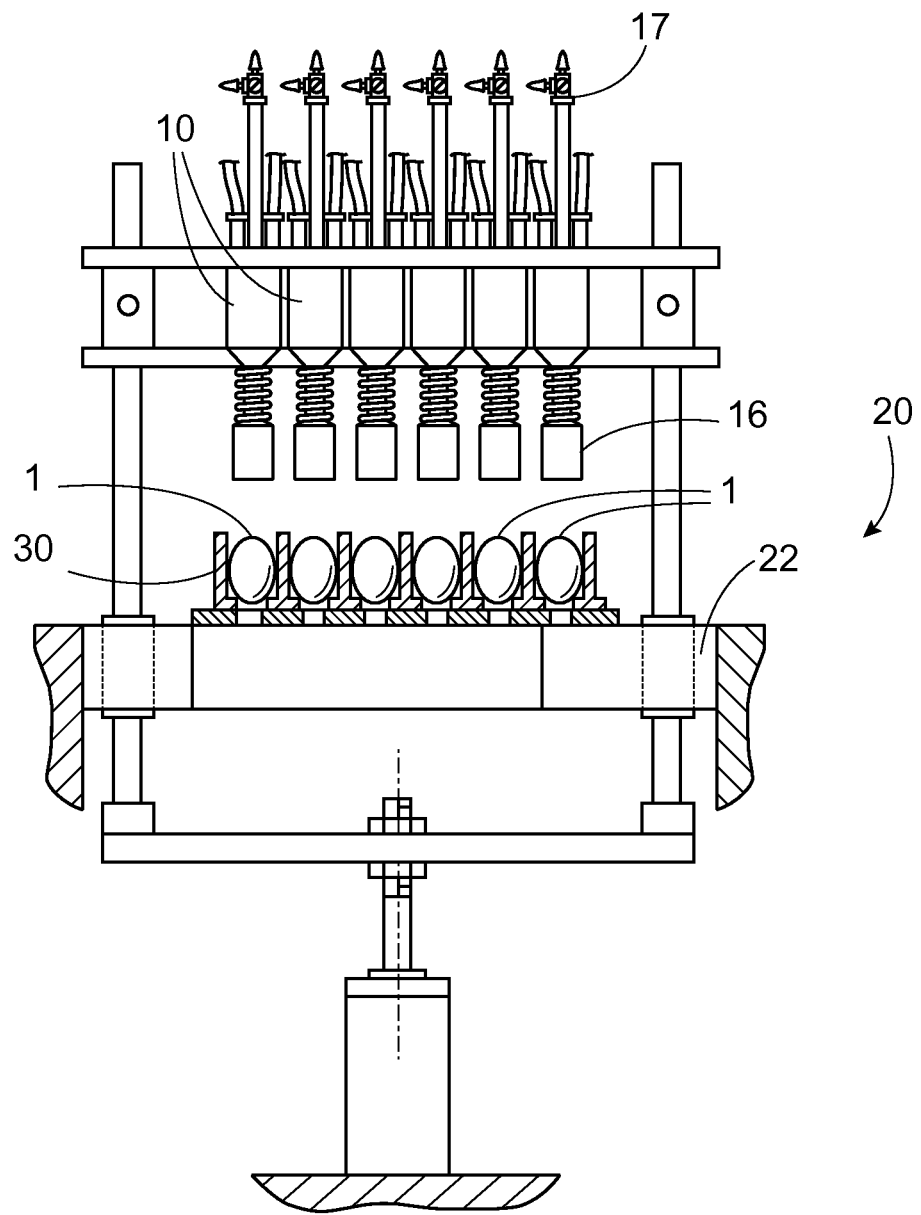
Figure 2:
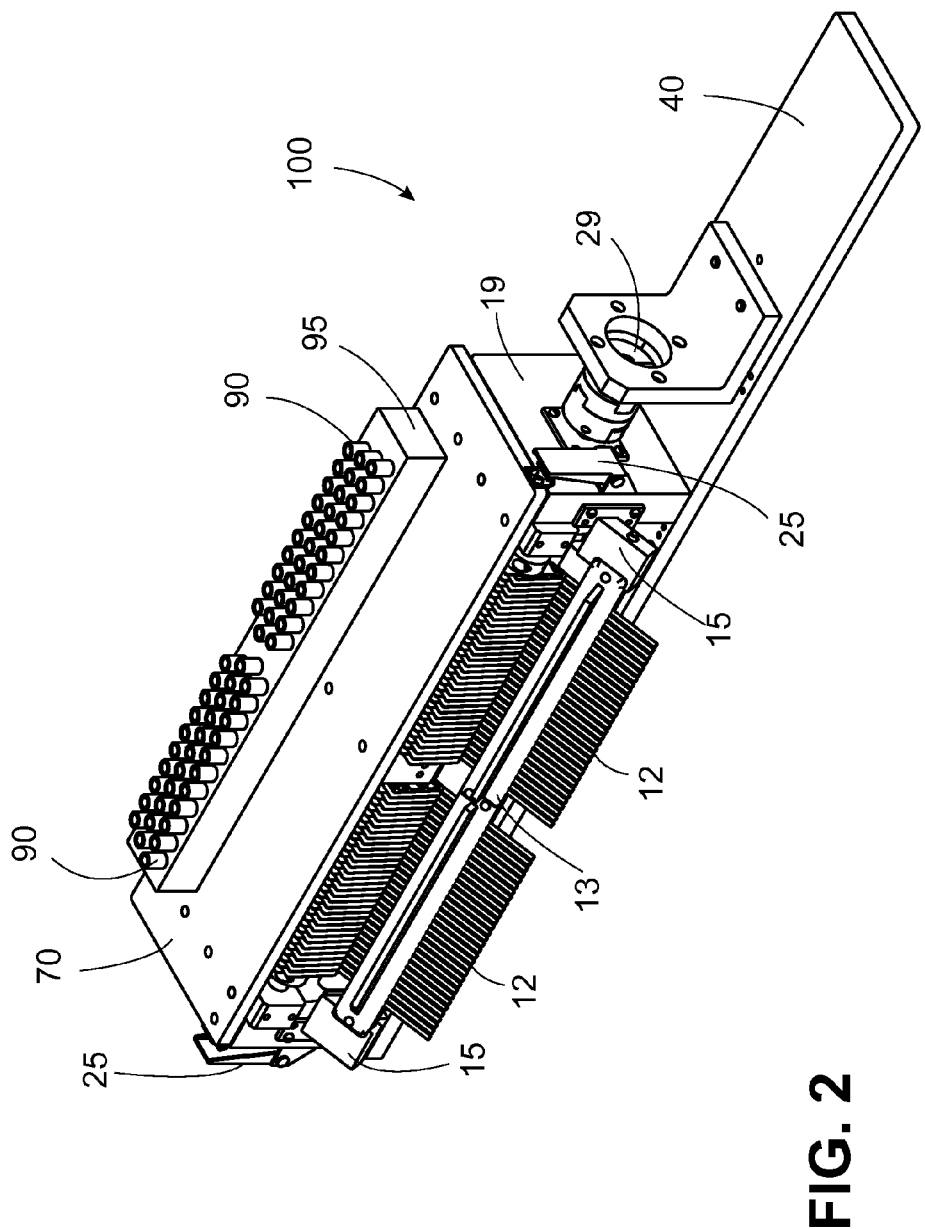
Figure 3:
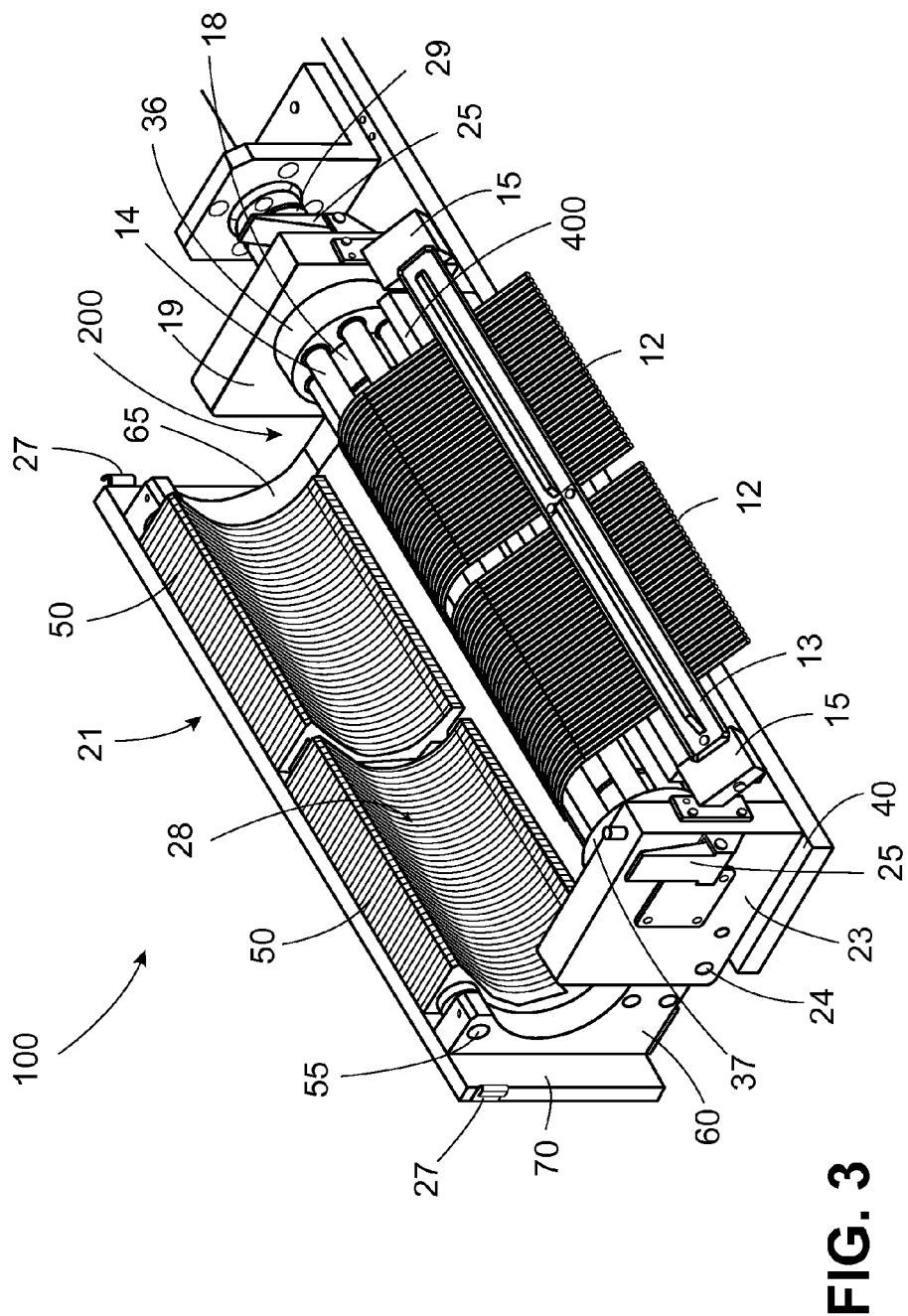
Figure 4:
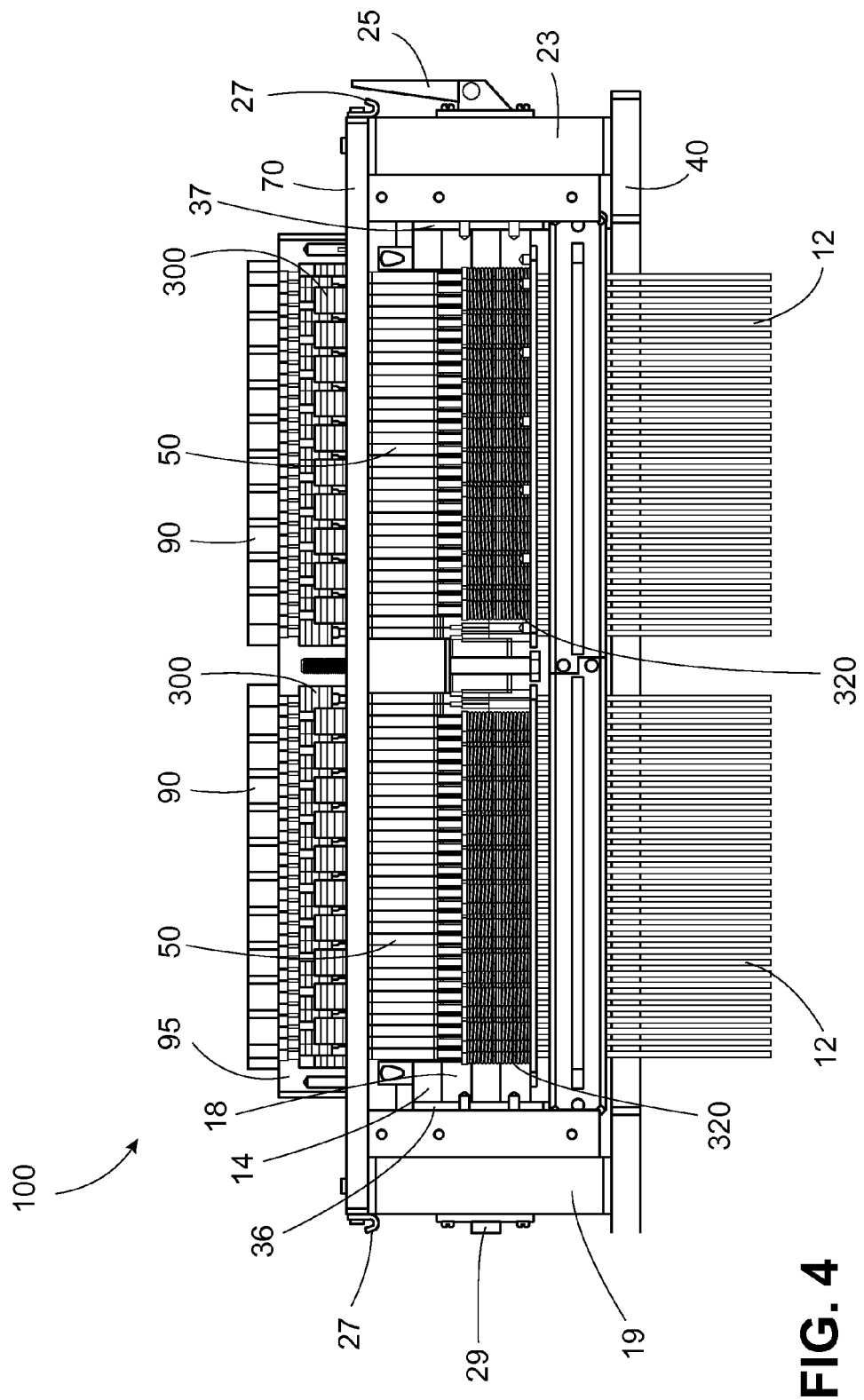
Figure 5:
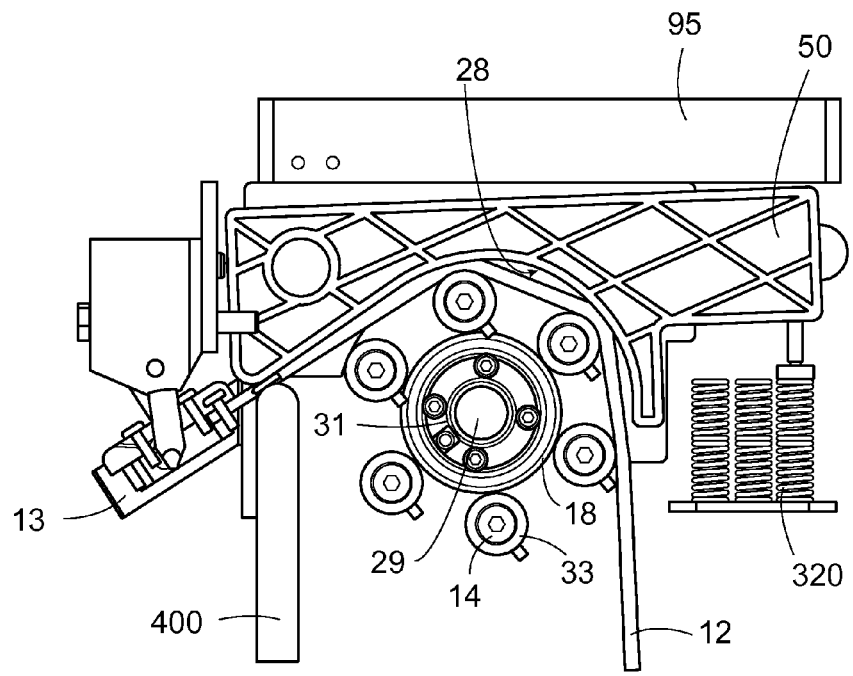
Figure 6:
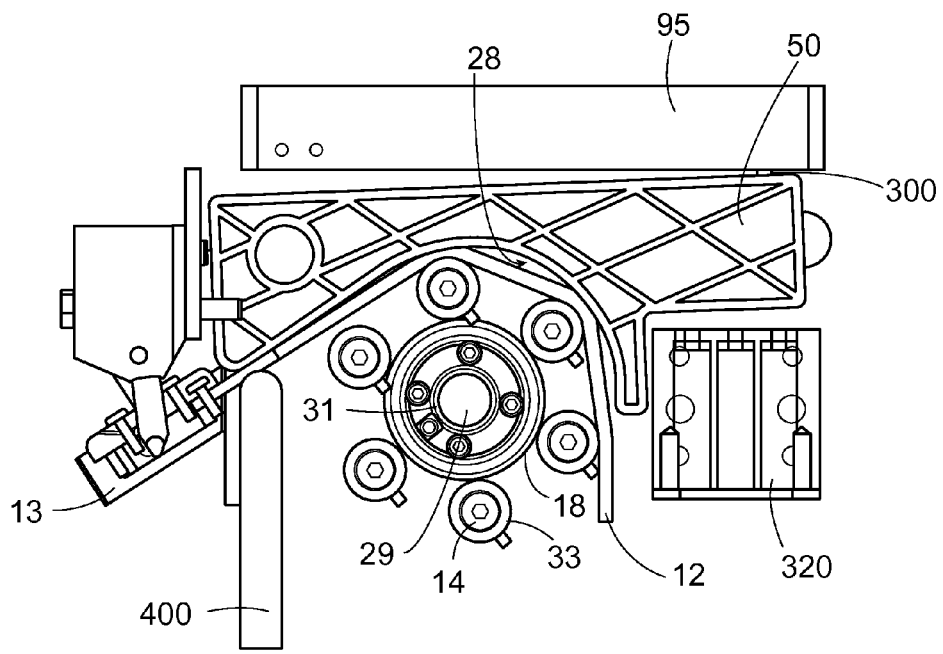
Figure 7:
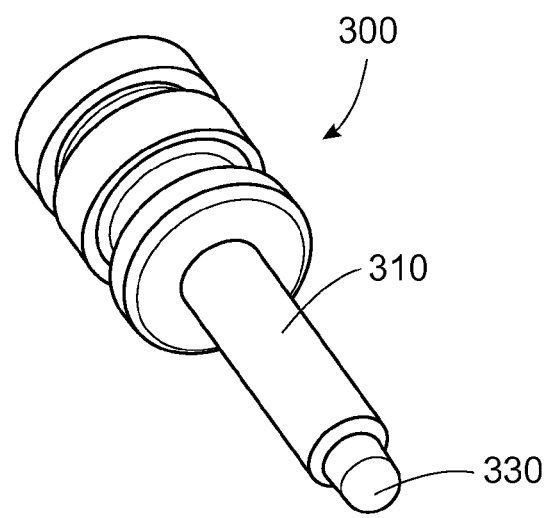
Figure 8:
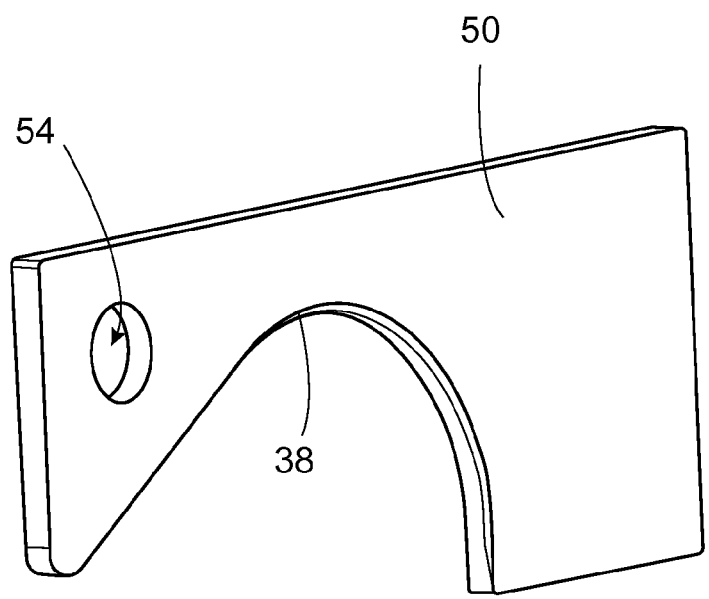
Figure 9:
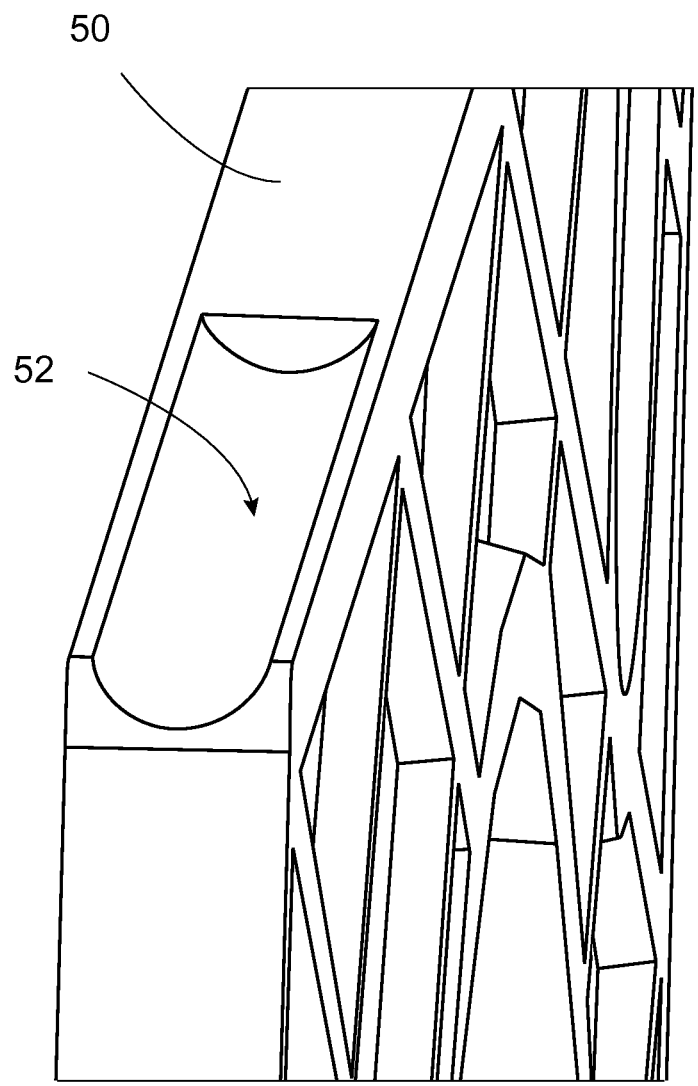
Figure 10:
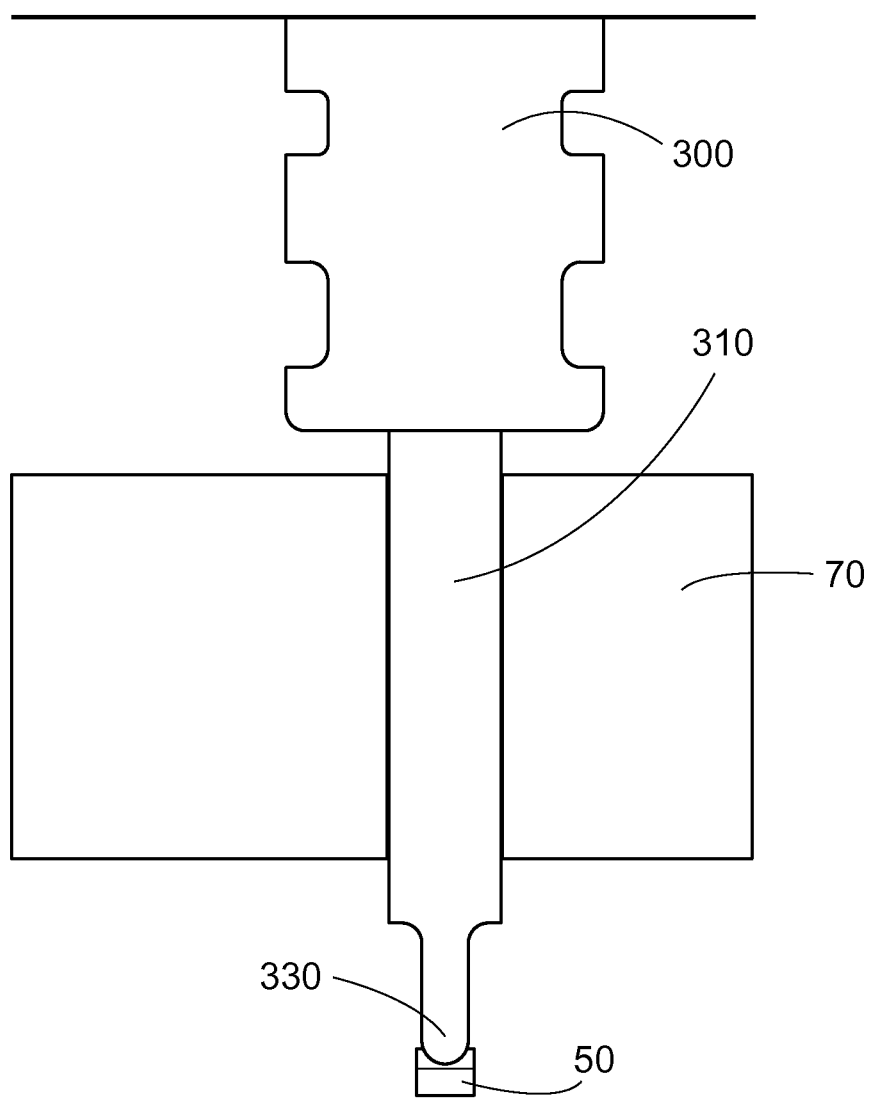
Figure 11:
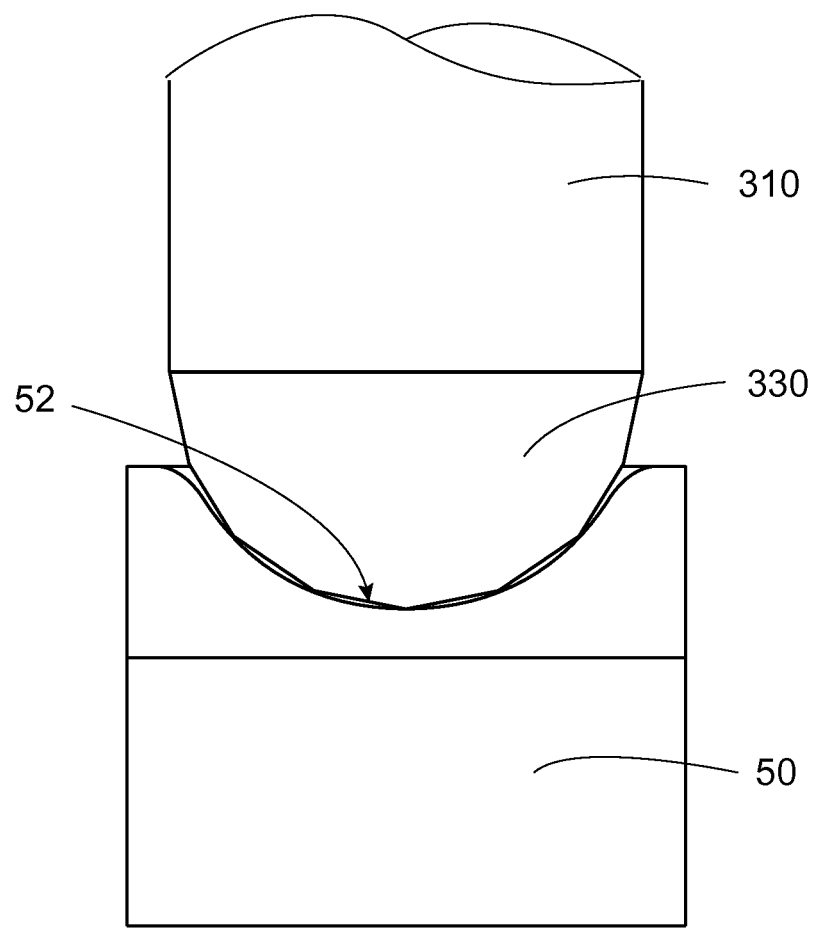
Figure 12:
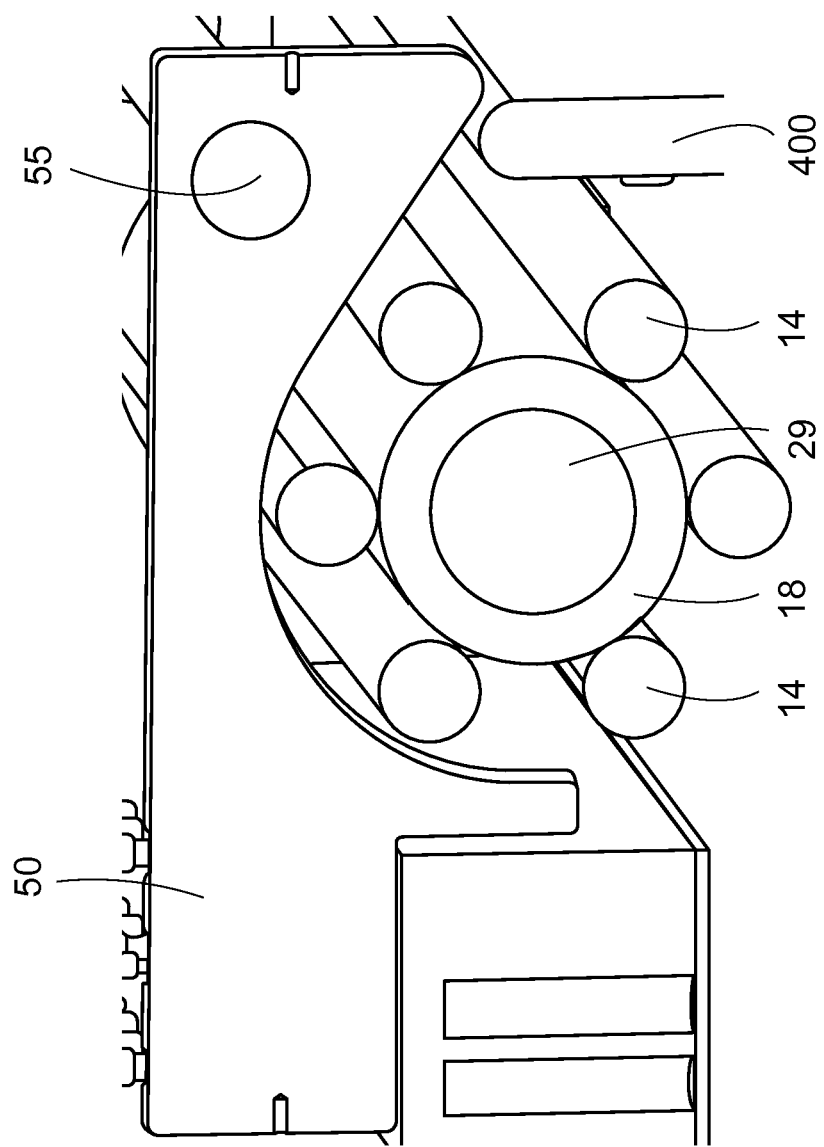
Figure 13:
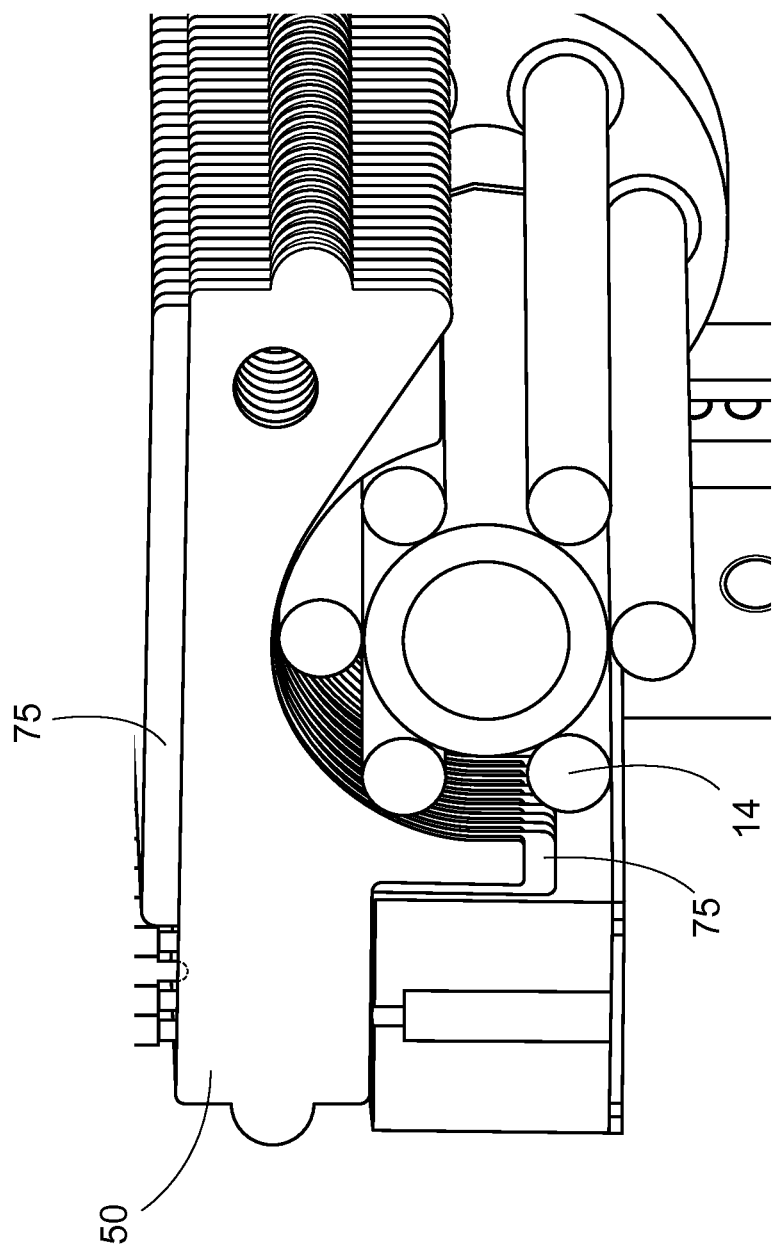
Figure 16:
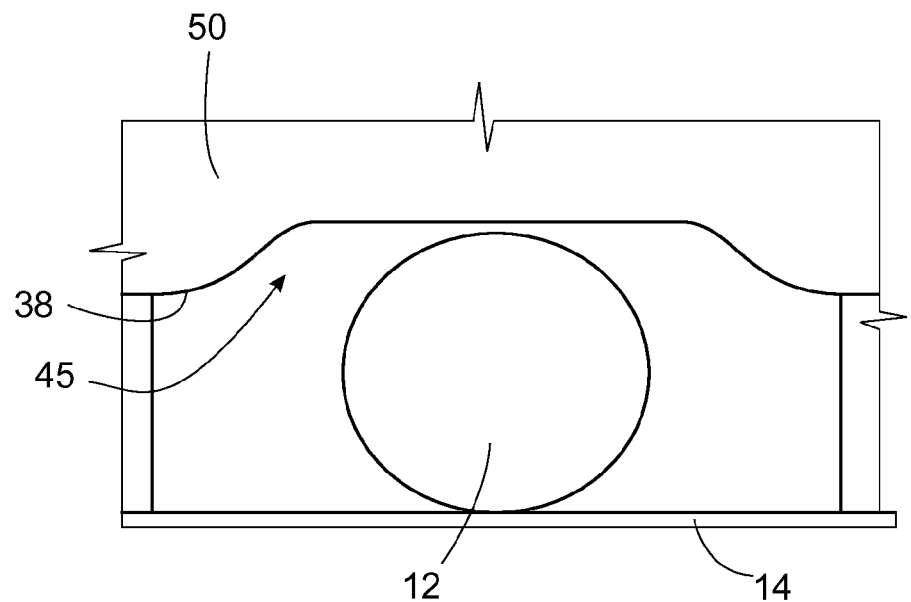
Figure 17:
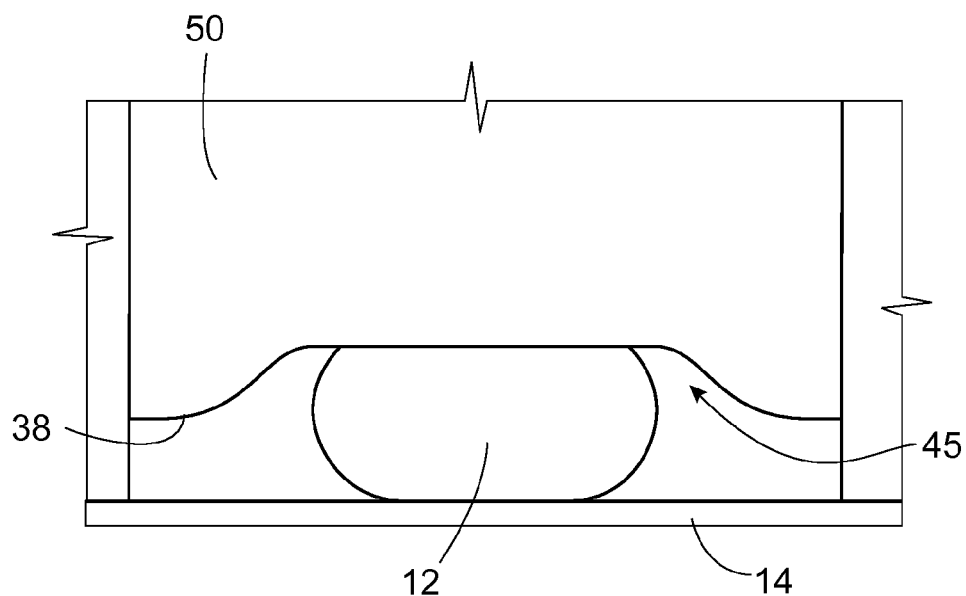
Figure 18:
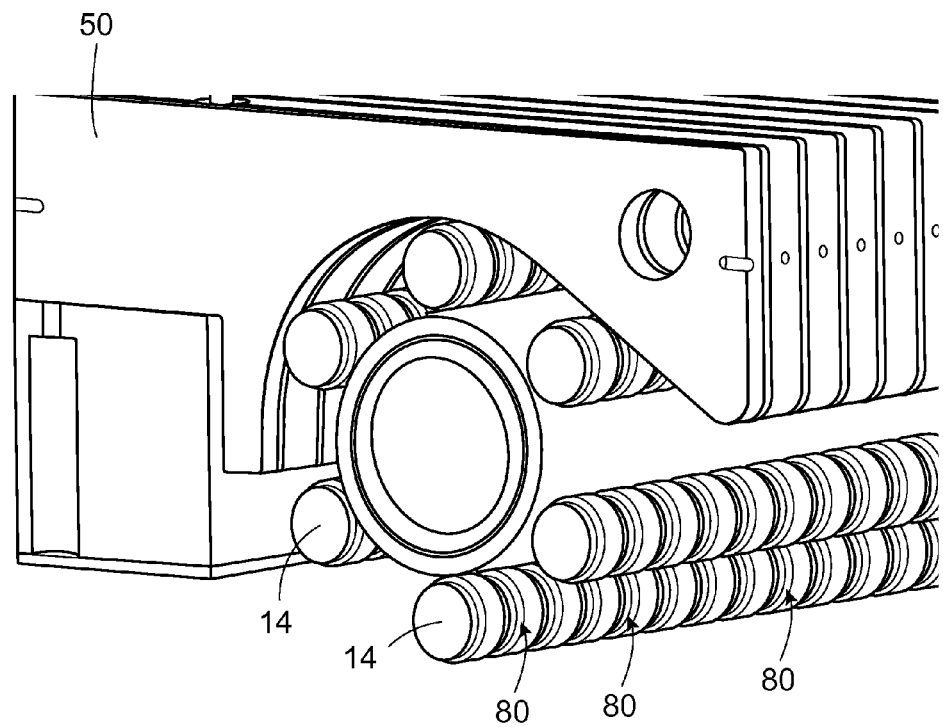
Figure 19:
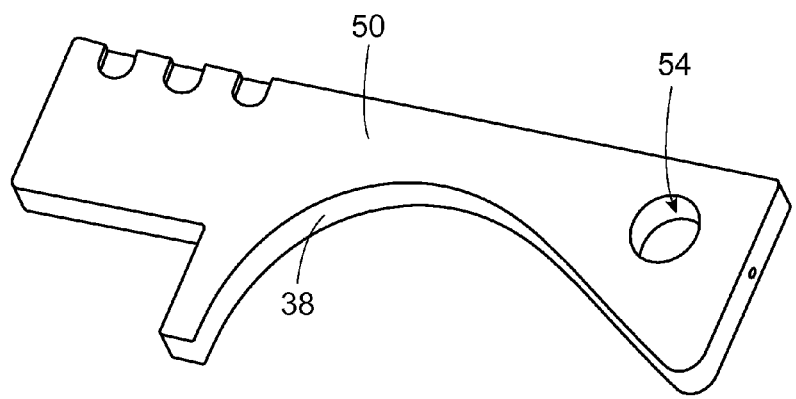
Figure 20:
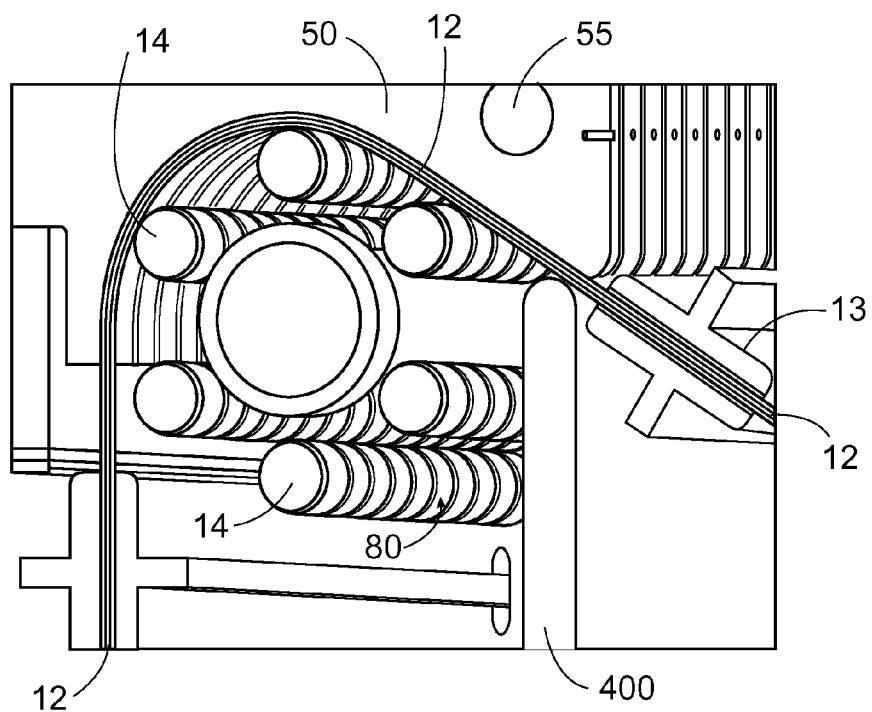
Figure 21:
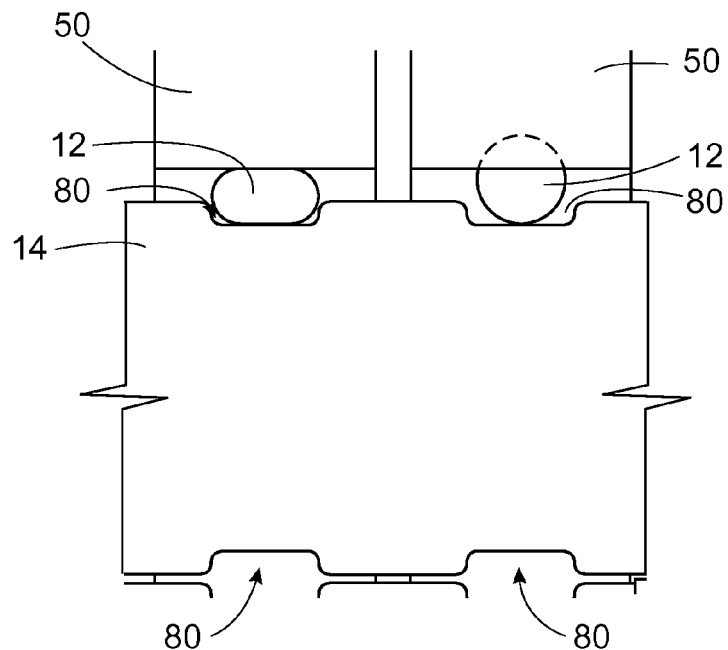
Figure 22:
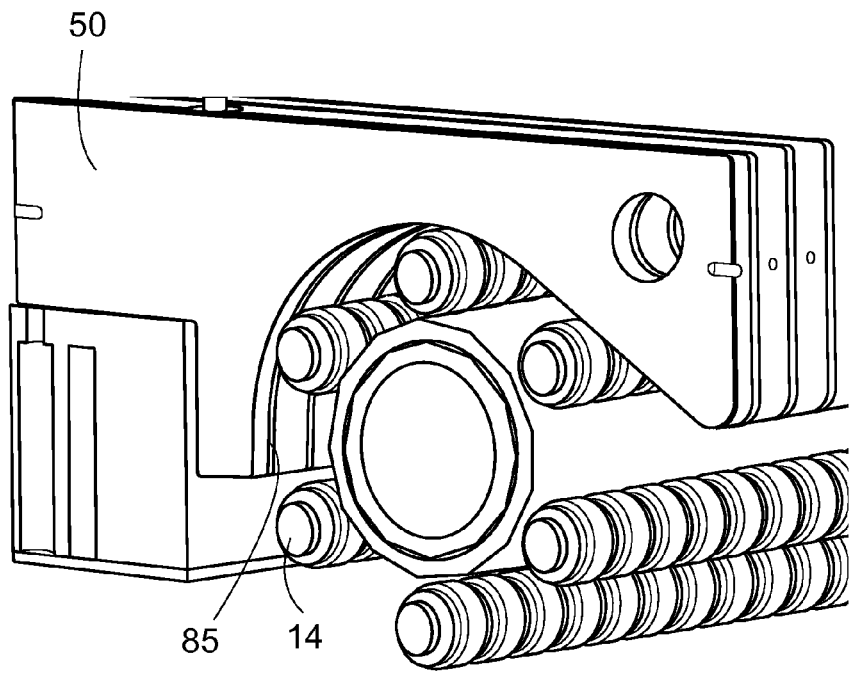
Figure 23:
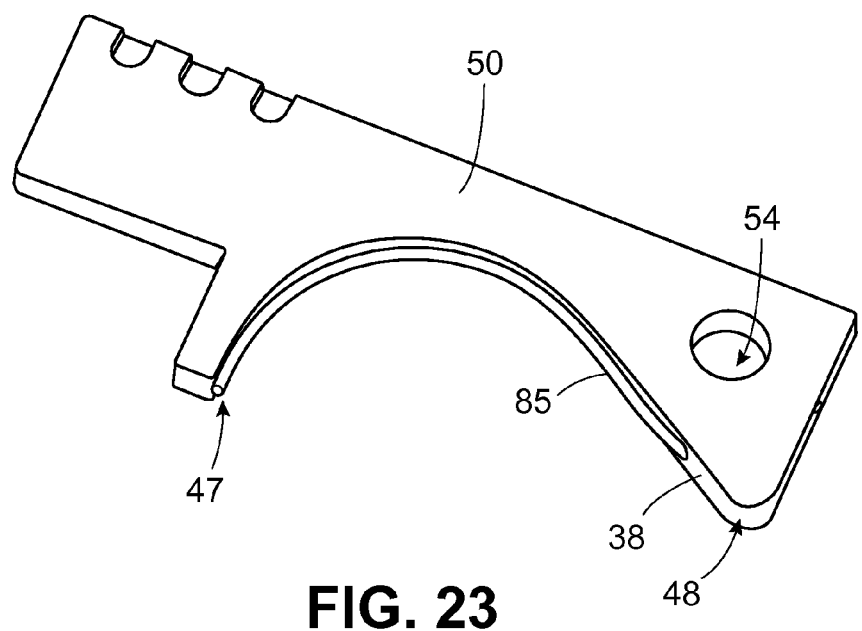
Figure 24:
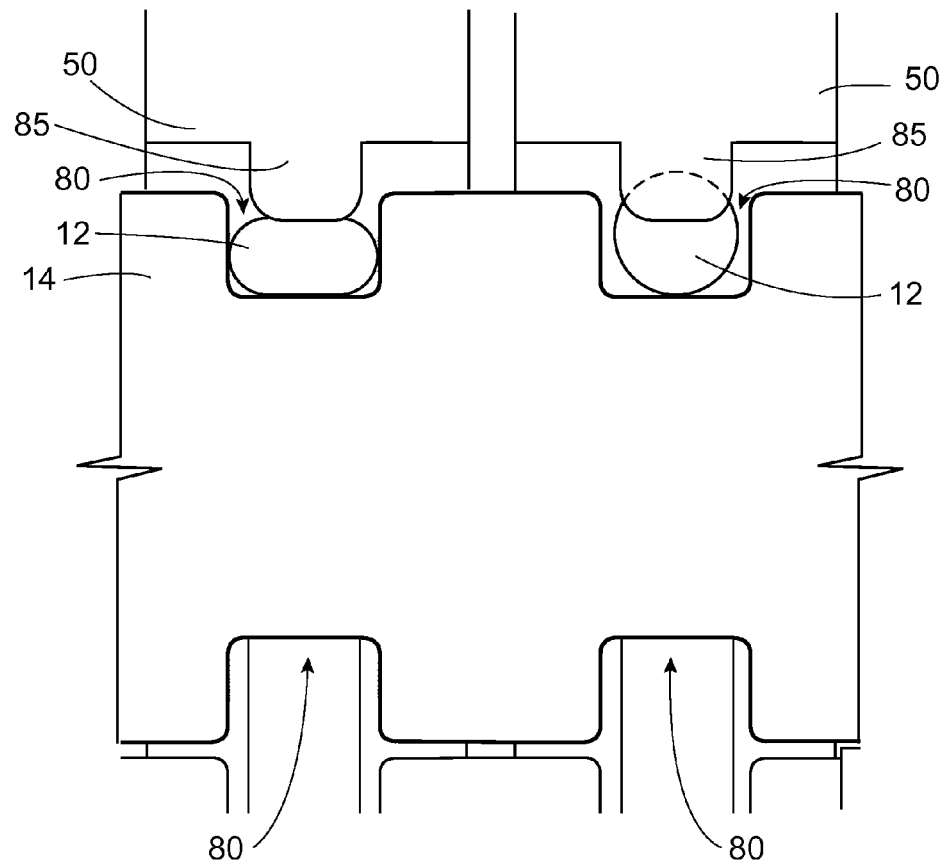

Having thus described various embodiments of the present disclosure in general terms, reference will now be made to the accompanying drawings, which are not necessarily drawn to scale, and wherein:

FIG. 1 is a schematic section view of an in ovo injection system capable of implementing a selective peristaltic pump assembly, according to one aspect of the present disclosure;

FIG. 2 is a perspective view of a selective peristaltic pump assembly, according to one aspect of the present disclosure;

FIG. 3 is a perspective view of the selective peristaltic pump assembly of FIG. 2, with a lid assembly in an open position;

FIG. 4 is an elevation view of selective peristaltic pump assembly of FIG. 2;

FIG. 5 illustrates a single delivery line of a selective peristaltic pump assembly, wherein fluid is prevented from moving through the delivery line, according to one aspect of the present disclosure;

FIG. 6 illustrates a single delivery line of a selective peristaltic pump assembly, wherein fluid is allowed to flow through the delivery line, according to one aspect of the present disclosure;

FIG. 7 is a perspective view of an actuator implemented on a selective peristaltic pump assembly, according to one aspect of the present disclosure;

FIG. 8 is a perspective view of an engagement member implemented on a selective peristaltic pump assembly, according to one aspect of the present disclosure;

FIG. 9 is a perspective sectional view of the engagement member of FIG. 8;

FIG. 10 is a cross-section view of an actuator interacting with an engagement member of a selective peristaltic pump assembly, according to one aspect of the present disclosure;

FIG. 11 illustrates a tip of an actuator interacting with an engagement member of a selective peristaltic pump assembly, according to one aspect of the present disclosure;

FIG. 12 is a perspective sectional view of a selective peristaltic pump assembly, according to one aspect of the present disclosure;

FIG. 13 is a perspective sectional view of a selective peristaltic pump assembly having a plurality of spacers, according to one aspect of the present disclosure;

FIG. 14 is a perspective sectional view of a selective peristaltic pump assembly having a plurality of engagement members, each defining a groove, according to one aspect of the present disclosure;

FIG. 15 is a perspective view of an engagement member defining a groove for maintaining alignment of a fluid delivery tube, according to one aspect of the present disclosure;

FIG. 16 is a cross-sectional view illustrating a fluid delivery tube in a non-compressed state and disposed between a tube roller and an engagement member having a groove, according to one aspect of the present disclosure;

FIG. 17 is a cross-sectional view illustrating a fluid delivery tube in a compressed state and disposed between a tube roller and an engagement member having a groove, according to one aspect of the present disclosure;

FIG. 18 is a perspective sectional view of a selective peristaltic pump assembly having a plurality of tube rollers, each defining a roller groove, according to one aspect of the present disclosure;

FIG. 19 is a perspective view of an engagement member implemented in a selective peristaltic pump assembly having a plurality of tube rollers, each defining a roller groove, according to one aspect of the present disclosure;

FIG. 20 is a perspective sectional view of a selective peristaltic pump assembly having a plurality of tube rollers, each defining a roller groove, according to one aspect of the present disclosure;

FIG. 21 is a cross-sectional view illustrating one fluid delivery tube in a compressed state and another fluid delivery tube in a non-compressed state, wherein the fluid delivery tubes are disposed between respective engagement members and a tube roller having roller grooves, according to one aspect of the present disclosure;

FIG. 22 is a perspective sectional view of a selective peristaltic pump assembly having a plurality of tube rollers, each defining a roller groove, and a plurality of engagement members, each having a profile configured to interact with a fluid delivery tube, according to one aspect of the present disclosure;

FIG. 23 is a perspective view of an engagement member implemented in a selective peristaltic pump assembly, each engagement member having a profile configured to interact with a fluid delivery tube, according to one aspect of the present disclosure; and FIG. 24 is a cross-sectional view illustrating one fluid delivery tube in a compressed state and another fluid delivery tube in a non-compressed state, wherein the fluid delivery tubes are disposed between respective engagement members having a profile and a tube roller having roller grooves, according to one aspect of the present disclosure.

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

FIG. 1 illustrates a section of an in ovo injection apparatus 20 having a plurality of the injection devices 10 that may be configured to inject one or more substances in multiple eggs according to some aspects of the present disclosure. The illustrated apparatus 20 includes a stationary base 22 and the injection devices 10. A flat 30 holds a plurality of eggs 1 in a substantially upright position. The flat 30 is configured to provide external access to predetermined areas of the eggs 1. Each egg 1 is held by the flat 30 so that a respective end thereof is in proper alignment relative to a corresponding one of the injection devices 10 as the injection device 10 advances towards the base 22 of the apparatus.

Each of the plurality of injection devices 10 has opposing first and second ends 16, 17. The injections devices 10 have a first extended position and a second refracted position. Upon extension of an injection device 10, the first end 16 is configured to contact and rest against predetermined areas of an external egg shell. From this position, a punch (not shown) within the injection device 10 forms a small opening in the shell and an injection needle (not shown) is inserted therethrough to deliver one or more treatment substances into the egg. When not injecting, the injection devices 10 are retracted to rest a predetermined distance above the eggs 1 and stationary base 22.

As discussed previously, in some instances, in ovo injection may be implemented selectively such that a treatment substance is not dispensed into dead, infertile, or missing eggs, for example. As such, each injection device 10 may be configured to selectively deliver discrete amounts of a treatment substance. In this regard, the in ovo injection apparatus 20 may include a fluid delivery system, such as, for example, a selective peristaltic pump assembly 100 configured to selectively deliver a treatment substance through each injection device 10. The selective peristaltic pump assembly 100 may be plumbed into the in ovo injection apparatus 20 such that the selective peristaltic pump assembly 100 is in fluid communication with the injection devices 10 using appropriate fluid connectors, tubes, etc. at, for example, second end 17. In this manner, the injection devices 10 may selectively dispense the fluid treatment substance into the eggs 1 located in the flat 30.

According to some aspects, the selective peristaltic pump assembly 100 may be capable of being directed to selectively deliver a fluid treatment substance to a respective delivery device 10. For example, a candling device (not shown) may be used to classify the eggs in the flat 30 as viable or non-viable when conveyed through the in ovo injection apparatus 20. In some instances, such classification information may be transmitted to an egg remover for removal of the non-viable eggs from the flat 30 such that only viable eggs are conveyed to the injection devices 10, and then the classification information is also transmitted to a selective means of the selective peristaltic pump assembly 100 such that the fluid treatment substance is only dispensed at locations where eggs (viable) are present. In other instances, where an egg remover is not used, the classification information may be transmitted to the selective means of the selective peristaltic pump assembly 100 such that the fluid treatment substance is dispensed through the injection devices 10 at locations with viable eggs, while no dispensing occurs at the injection devices 10 associated with the eggs identified as non-viable.

Referring now to FIGS. 2-4, there is illustrated a selective peristaltic pump assembly 100 with a base plate 40 and capable of association with a drive motor. A plurality of compressible fluid delivery tubes 12 may be mounted on the selective peristaltic pump assembly 100 and extends from front tube clamping means 13 over a plurality of driven tube rollers 14 to rear tube clamping means (not shown). Tube clamping means 13 may be secured to the front of the selective peristaltic pump assembly 100 by brackets 15 mounted on end plates 19 and 23. A corresponding tube clamping means is secured to the rear of the pump assembly by brackets mounted on end plates 19 and 23. Tube rollers 14 may be rotatably mounted in roller supports 36 and 37 and each roller support may be fixed to and rotated on a central drive shaft 29 about a longitudinal axis of the selective peristaltic pump assembly 100. Centrally disposed along the longitudinal axis within the confines of the tube rollers 14 may be a support roller 18 that is in positive surface contact with the tube rollers 14 so as to provide lateral support along the length of the tube rollers 14 to prevent radial deflection of the tube rollers 14 between the roller supports 36, 37 at each end. The tube rollers 14, the roller supports 36 and 37, the central drive shaft 29, and the support roller 18 may cooperate to form a rotatable assembly generally indicated as 200.

An arcuate backing plate arrangement indicated generally at 21 is shown in FIG. 3 in a rotated open position for clarity of illustration. A plurality of engagement members 50 or otherwise known as blade members may cooperate to form a portion of the backing plate arrangement 21 and an arcuate surface 28, wherein the backing plate arrangement 21 may be spaced from the rotatable assembly 200 a predetermined distance when rotated to a closed position. The engagement members 50 may be pivotably hinged to a pivot rod 55 extending between end caps 60, 65 attached to a top plate 70. The backing plate arrangement 21 may be pivotally mounted to end plates 19 and 23 by means of pins 24 that engage pivot holes near the rear edge of the end caps 60, 65. The backing plate arrangement 21 may be pivotally mounted to provide access to the tube rollers 14 when mounting or removing the compressible fluid delivery tubes 12, and to permit the compressive forces against the compressible fluid delivery tubes 12 to be released when the selective peristaltic pump assembly 100 is not in operation. During operation, the backing plate arrangement 21 may be securely clamped in position by means of swing clamps 25 mounted on end plates 19 and 23, and corresponding engaging hooks 27 mounted on the top plate 70 of the backing plate arrangement 21. The compressible fluid delivery tubes 12 which overly tube rollers 14 may be compressed by the tube rollers 14 against the arcuate surface 28 of the backing plate arrangement 21.

FIGS. 5 and 6 illustrate a cross-sectional view of the selective peristaltic pump assembly 100 with the backing plate arrangement 21 locked in position for operation. FIG. 12 also illustrates the arrangement with the backing plate arrangement 21 in the operative position. The tube rollers 14 may be mounted in roller support 36 so as to rotate in a clockwise direction around the central drive shaft 29. Each tube roller may be rotatably supported in roller support 36 by bearing means 33 which permit each tube roller 14 to rotate freely about its own axis in a counterclockwise direction as the rotatable assembly 200 rotates clockwise. Disposed between and in positive surface contact with tube rollers 14 may be the support roller 18 which is rotatably mounted on central drive shaft 29 through bearing means 31 which allow the support roller 18 to rotate freely in a clockwise direction as driven by contact with tube rollers 14 as the rotatable assembly 200 rotates about the central axis.

The compressible fluid delivery tubes 12 may be compressed by tube rollers 14 against arcuate surface 28 of backing plate arrangement 21. The length of arcuate surface 28 may be such that each compressible fluid delivery tube 12 is compressed by at least one and preferably by at least two tube rollers 14 at all times. The arcuate surface 28 of the backing plate arrangement 21 may be spaced from the surface of tube rollers 14 by a distance which allows the tube rollers 14 to compress and securely close the lumen of compressible fluid delivery tubes 12 without unduly crushing the compressible fluid delivery tubes 12.

The roller supports 36 and 37 may be fixedly secured to the central drive shaft 29 and rotate with it. The tube rollers 14 may be rotatably supported in roller supports 36 and 37 by bearing means 33. The end plate 19 may be channeled to receive the proximal ends of the tube rollers 14 extending through the roller support 36, and may be provided with a ring gear (not shown) which engages mating gear teeth (not shown) on the end of each tube roller 14, thereby providing each tube roller 14 with a positive rotational drive as the roller supports 36 and 37 rotate with drive shaft 29 about the longitudinal axis of the selective peristaltic pump assembly 100.

Referring now to the selective aspects of the present disclosure, means for pinching the compressible fluid delivery tube 12, such as, for example, engagement member 50, may be associated with a respective compressible fluid delivery tube 12 such that the engagement member 50 may interact therewith to facilitate selective means for dispensing a fluid treatment substance. According to some aspects, each engagement member 50 may be pivoted using a respective actuator 300 of an actuator assembly to select or de-select a compressible fluid delivery tube 12 for dispense. In some instances, the actuator 300 may be pneumatically operated, although other types of actuators may be implemented as well. A pneumatic source may be in fluid communication with the selective peristaltic pump assembly 100 via a plurality of fluid connectors 90 mounted on a manifold 95 attached to the top plate 70. In some instances, the actuators 300 may be disposed within the manifold 95.

In this regard, the individual engagement members 50 may be actuated for every compressible fluid delivery tube 12 required to coincide with the number of injection devices 10 on the injection head. In operation, the engagement member 50 may pivot forward or otherwise be displaced by being selectively actuated by a pneumatic cylinder member 310. As shown in FIG. 6, this forward pivoting motion may compress the compressible fluid delivery tube 12 on the set of tube rollers 14 so as to cause the fluid treatment substance in the compressible fluid delivery tube 12 to be pushed through the compressible fluid delivery tube 12 within the assembly 100. If the compressible fluid delivery tube 12 does not require the fluid treatment substance to be dispensed, according to the classification signal transmitted by the candling device, then the engagement member 50 may be de-selected pneumatically and may be maintained in a de-selected position with a biasing member 320 (e.g., a spring), as shown in FIG. 5, in a non-biased position. The de-selected position causes the compressible fluid delivery tube 12 to be pinched off using the opposite end of the engagement member 50 against a front wall 400. In the selected position, the actuator 300 may be actuated to pivot the engagement member 50 against the biasing member 320 such that the biasing member 320 is in a biased position. In such instances, when the actuator 300 is de-actuated the biasing member 320 forces the engagement member 50 to the de-selected position.

According to some aspects, the pneumatic cylinder member 310 may include a tip portion 330 (FIGS. 7, 10 and 11) configured to mate within an indentation 52 (FIGS. 9 and 11) defined by the engagement member 50. Each engagement member 50 may define an aperture 54 (FIG. 8) for receiving the pivot rod 55 therethrough such that the arcuate surface 28 may be formed, as shown in FIG. 3. The engagement members 50 may be thin, plate-like structures with a width approximately similar to that of the compressible fluid delivery tubes 12. In some instances, as shown in FIG. 13, a plurality of spacers 75 may be provided, each spacer 75 being positioned between an adjacent pair of engagement members 50. The spacers 75 may be similarly shaped or configured as the engagement or blade members 50.

The actuators 300 may be in communication with the candling device to receive the classification information such that during an injection sequence the actuators 300 may be selectively and individually actuated to cause a selective dispense through a respective injection device 10 if a respective egg is classified as viable. In this manner, the selective peristaltic pump assembly 100 can provide selective delivery of the fluid treatment substance to the injection devices 10 such that selective injection of the fluid treatment substance may occur according to the classification status of a respective egg.

According to various aspects of the present disclosure, the engagements members 50 and the tube rollers 14 may cooperate to maintain the compressible fluid delivery tubes 12 in appropriate alignment. That is, the engagements members 50 and/or the tube rollers 14 may be configured to prevent the fluid delivery tubes 12 from drifting outside the width of the respective engagement member 50, which drifting could lead to inadequate functioning of the respective engagement member 50 with respect to delivering fluid. In this regard, containment and control of the positioning of the fluid delivery tubes 12 may be provided so as to facilitate accurate and reliable fluid dispense, while also minimizing the wear that may occur to the fluid delivery tubes 12 during the pumping operation. Thus, aspects of the present disclosure promote improved mechanical compression and fluid control.

Accordingly, in some instances, as shown in FIGS. 14-17, each engagement member 50 may define a groove 45 on the underside thereof at an arcuate portion 38. The groove 45 may be configured to maintain a respective fluid delivery tube 12 therewithin to prevent the fluid delivery tube 12 from drifting outside the width of the engagement member 50. In some instances, the groove 45 may begin at a proximal end 47 of the arcuate portion 38 and then terminate prior to a distal end 48 of the arcuate portion 38. Further, the groove 45 may taper at its termination point proximate the distal end 48 such that limit mechanical wearing of the fluid delivery tubes 12.

According to other aspects, as shown in FIGS. 18-21, each tube roller 14 may define a series of roller grooves 80 about the circumference thereof and positioned along the length thereof. In this regard, the fluid delivery tubes 12 may be positioned within a respective roller groove 80 for containment thereof, wherein the fluid delivery tubes 12 may be tensioned so as to maintain their position within the roller grooves 80. In some instances, the arcuate portion 38 of the engagement member 50 may be relatively flat, as shown in FIG. 21. In other instances, as shown in FIGS. 22-24, the arcuate portion 38 may include a profile 85 that protrudes and is configured to correspondingly fit within the roller groove 80, as particularly shown in FIG. 24. Such a configuration may permit the profile 85 to extend within the roller groove 80 in order to compress the respective fluid delivery tube 12 when actuated. In some instances, the profile 85 may begin at the proximal end 47 of the arcuate portion 38 and then terminate prior to the distal end 48 of the arcuate portion 38. In instances where the profile 85 is provided, the roller grooves 80 may be deeper than in instances where the profile 85 is not used.

Many modifications and other aspects of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A peristaltic pump assembly, comprising:
   a housing;
   a rotatable assembly disposed within the housing and having a plurality of tube rollers adapted to interact with a plurality of compressible fluid delivery tubes;
   a plurality of engagement members being individually actuatable and cooperating to form a backing plate arrangement spaced from the rotatable assembly a predetermined distance in order to facilitate closure of a respective compressible fluid delivery tube disposed between the rotatable assembly and the respective engagement member, each engagement member cooperating with the tube rollers to maintain a respective compressible fluid delivery tube in alignment therewith;
   an actuator assembly having a plurality of actuators, each actuator being associated with a respective engagement member and being configured to interact with a topside thereof to displace the engagement member for interacting with the respective compressible fluid delivery tube associated therewith; and
   a plurality of biasing members, wherein each engagement member has at least one of the biasing members associated therewith, each biasing member being disposed underside of the engagement member and configured to urge the engagement member against a respective compressible fluid delivery tube so as to pinch the compressible fluid delivery tube to prevent delivery of a fluid therethrough.

2. A peristaltic pump assembly according to claim 1, wherein the rotatable assembly comprises a plurality of tube rollers adapted to interact with the compressible fluid delivery tubes, each engagement member cooperating with the tube rollers to maintain a respective compressible fluid delivery tube in alignment therewith.

3. A peristaltic pump assembly according to claim 2, wherein each engagement member defines a groove configured to maintain a respective compressible fluid delivery tube therewithin.

4. A peristaltic pump assembly according to claim 2, wherein each tube roller defines a series of roller grooves configured to maintain a respective compressible fluid delivery tube therewithin.

5. A peristaltic pump assembly according to claim 4, wherein each engagement member has a profile configured to fit within a respective roller groove so as to compress a respective compressible fluid delivery tube within the roller groove.

6. A peristaltic pump assembly according to claim 1, wherein the backing plate arrangement further comprises a pivot rod configured to receive the engagement members in a pivotable manner.

7. A method of selectively pumping fluids through a plurality of compressible fluid delivery tubes, the method comprising:
   mounting a plurality of compressible fluid delivery tubes between a plurality of engagement members, cooperating to form a backing plate arrangement, and a rotatable assembly spaced from the backing plate arrangement a predetermined distance in order to facilitate closure of a lumen of a respective compressible fluid delivery tube in an area of contact;
   selectively actuating the engagement members to interact with respective compressible fluid delivery tubes using an actuator assembly having a plurality of actuators, each actuator being associated with a respective engagement member and being configured interact with a topside thereof to displace the engagement member for interacting with the respective compressible fluid delivery tube associated with the engagement member, and a plurality of biasing members associated with the engagement members, each biasing member being disposed underside of the engagement member and configured to urge the engagement member against a respective compressible fluid delivery tube so as to pinch the compressible fluid delivery tube to prevent delivery of a fluid therethrough; and
   rotating the rotatable assembly in a direction about a central axis thereof and along a length of the compressible fluid delivery tubes so as to supply a fluid substance through the compressible fluid delivery tubes associated with the engagement members being selectively actuated.

8. A method according to claim 7, further comprising the step of positioning each compressible fluid delivery tube between a plurality of roller tubes and a respective engagement member, the roller tubes and engagement members cooperating to maintain the compressible fluid delivery tubes in alignment.

9. An ovo injection apparatus adapted to inject a plurality of avian eggs with a treatment substance, the apparatus comprising:
   an injection assembly having a plurality of injection devices, each injection device being configured to pierce a respective avian egg;
   a selectable peristaltic pump assembly in fluid communication with the injection assembly, the selectable peristaltic pump assembly being configured to selectively supply a treatment substance from a fluid reservoir to the injection devices such that the injection devices are capable of selectively dispensing the treatment substance;
   a plurality of compressible fluid delivery tubes disposed between the fluid reservoir and the injection assembly, the compressible fluid delivery tubes engaging the selectable peristaltic pump assembly between the fluid reservoir and the injection assembly;
   wherein the selectable peristaltic pump assembly comprises:
      a housing;
      a rotatable assembly disposed within the housing and configured to interact with the compressible fluid delivery tubes; and
      a plurality of engagement members being individually actuatable and cooperating to form a backing plate arrangement spaced from the rotatable assembly a predetermined distance in order to facilitate closure of a respective compressible fluid delivery tube disposed between the rotatable assembly and the respective engagement member;
      an actuator assembly having a plurality of actuators, each actuator being associated with a respective engagement member and being configured to interact with a topside thereof to displace the engagement member for interacting with the respective compressible fluid delivery tube associated therewith; and
      a plurality of biasing members, wherein each engagement member has at least one of the biasing members associated therewith, each biasing member being disposed underside of the engagement member and configured to urge the engagement member against a respective compressible fluid delivery tube so as to pinch the compressible fluid delivery tube to prevent delivery of a fluid therethrough.

* * * * *